Nov. 19, 1940.  P. R. HARRIS ET AL  2,221,766
KITCHEN UNIT DEMONSTRATION SET
Filed Sept. 18, 1939  4 Sheets-Sheet 3

Inventors:-
Philip R. Harris,
Byron R. Pinney,
Ivan H. Ramsey,
BY
ATTORNEYS.

Patented Nov. 19, 1940

2,221,766

UNITED STATES PATENT OFFICE 2,221,766

KITCHEN UNIT DEMONSTRATION SET

Philip R. Harris, Byron R. Pinney, and Ivan H. Ramsey, Clinton, Iowa, assignors to Curtis Companies Incorporated, Clinton, Iowa, a corporation of Iowa Application September 18, 1939, Serial No. 295,480

22 Claims. (Cl. 35—7)

This invention relates to a new and improved apparatus for simplifying and perfecting the design of buildings, and while not specifically limited thereto, is principally concerned with perfecting a means for the designing or remodeling of residences or homes, whereby the prospective builder may be enabled to visualize the projected construction or changes in advance, and to adjust the design to fit his immediate and particular needs.

Heretofore, builders have always been faced with the problem of seeing in advance what the final job will look like, and how satisfactorily it will be adapted to their needs. Sometimes, of course, the plans are prepared by architects and submitted to the builder, but very few people are skilled in the reading of blueprints, and at best the prints are only two-dimensional.

As a result, builders are often subjected to expensive and troublesome changes in plans, and probably in the majority of cases it is only after the construction is finished and beyond the reasonable possibility of change that the disappointing features in the design and arrangement become apparent.

We have conceived that, if any apparatus could be devised that would be effective to overcome those difficulties for the ordinary non-technical builder, it must be designed to present the true proportions of the structure to be erected as it is only with reference to true proportion that the average person can in a practical manner understand the design and visualize the arrangement.

An object of our invention is to provide a demonstration set consisting of an apparatus to represent a portion of a room and articles in the room whereby the arrangement may be in any desired form.

Another object is to provide such a set in which the parts are simple, durable and of comparatively inexpensive construction.

A further object is to provide apparatus in which the component parts may be folded substantially flat for convenience in carrying and storing the same.

A further object is to provide component parts of such apparatus which may be conveniently folded into form to represent objects in their true height, width and depth, to a suitable reduced scale.

The increased interest in efficient kitchen arrangement which has grown up in the last decade has been marked by a strong trend toward the use of sectional kitchen cabinet units, factory made to standardized dimensions. A properly arranged set of such cabinets contributes greatly to the ease and convenience with which work can be done in the kitchen. The adaptation of these units to the available space, either in building a new house or in modernizing an old one, requires a certain amount of cut and try experimentation, and should preferably involve some means for vivid visual demonstration of various proposed arrangements, so that the plan best suited for efficient use, storage and disposal of the kitchen equipment can be selected.

More particularly, it is our object, for example, to provide a demonstration set representing a portion of the floor and two walls of a kitchen, with foldable members extending from the wall portions, representing wall cupboards and work tables or base cabinets.

We also provide cards or sheets of papers representing doors, windows and the like, all of which are made to scale whereby the doors and windows may be placed in proper position to represent a given kitchen. In addition, we provide gummed sheets or stickers representing cabinets of various heights, widths and constructional characteristics, adapted to be fastened to the surface of the portions representing cupboards and work table spaces.

Thus many different combinations may be worked out and the pictorial effect readily seen before the cabinets are purchased and are installed in the kitchen. The apparatus thus has great usefulness, for example, as a selling aid in connection with unit kitchen cabinet equipment.

Obviously, the set can be designed for use with objects other than cabinets and it may represent rooms other than a kitchen. With only slight modifications from the exemplification of our invention shown herein, the apparatus can be used for the planning of a home workshop lay-out, or a bathroom, as additional examples.

A further object is to provide a convenient scale to determine aggregate widths of the stickers, and for positioning the cards along the wall.

Another object is to provide members foldable to represent odd-shaped pieces of kitchen furnishings, such as a refrigerator or broom closet, the lower part of said members being adapted to overlie the base cabinet portion.

A still further object is to provide a construction for the wall members which permits representation of triangular corner cabinets where it is desired to gain cabinet space in building around the corner of the room.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Figure 1:
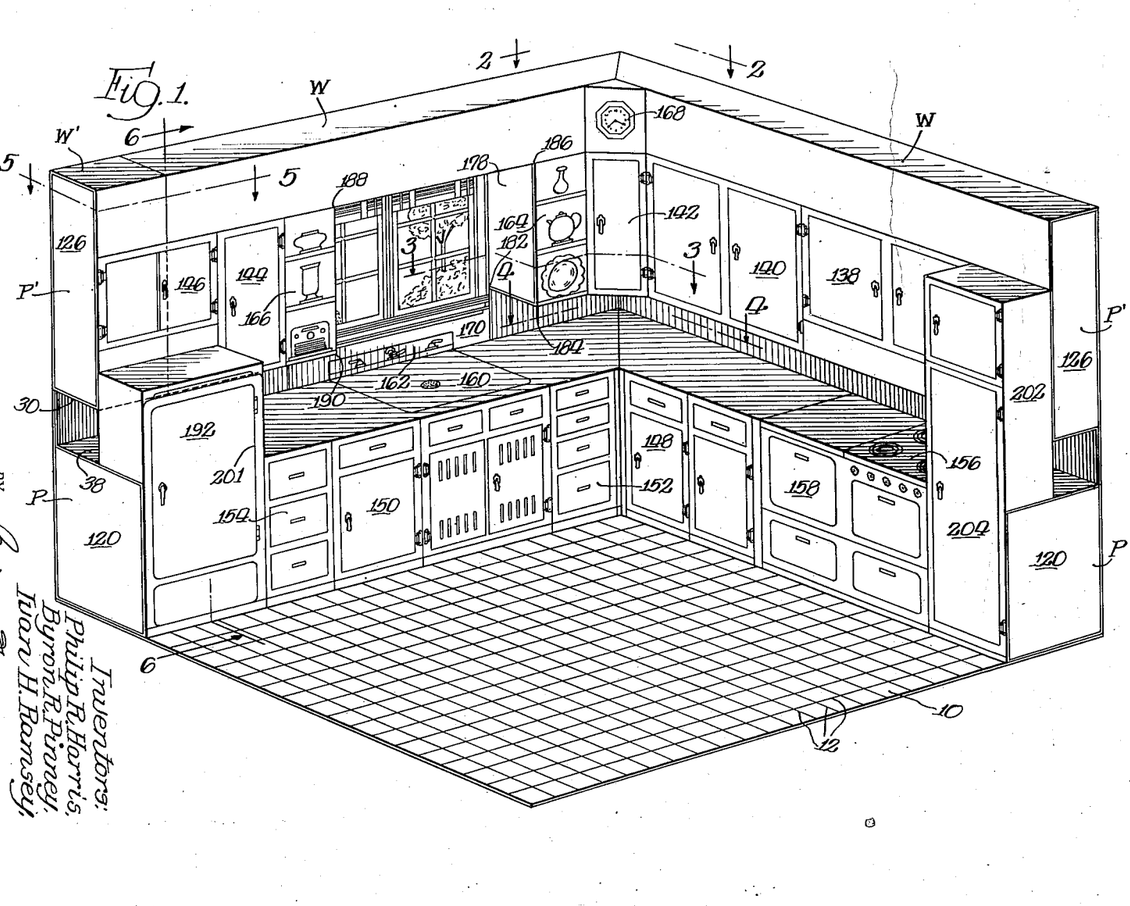
Figure 1 is an isometric view showing the parts of our demonstration set assembled in a typical simple kitchen layout.

In Figure 1 I have used the reference numeral 10 to indicate a floor section, which may be formed of heavy cardboard or similar suitable material. On the floor member 10 we have found it advantageous to provide a layout of parallel lines, indicated by the reference numeral 12, to some suitable scale; and we have found it particularly convenient to use a scale whereby the distance between parallel lines such as 12 would represent a full scale distance of six inches.

The second principal member of our demonstration set is what we have called the expandable wall section W, which is shown in Figures 8-13. This member is preferably formed from a single sheet of cardboard or bristol board as will be seen in Figure 9. The formation of the sheet of cardboard 14 can best be traced in Figure 9 from the joint 16, which represents the abutting edges of the sheet. From the joint 16, the portion 18 may be traced upwardly to the line 20, which is scored horizontally for the full length of the card to permit easy folding along that line. In the flattened form of the expandable wall section, the cardboard 14 is continued upwardly from the line 20 by the portion 22 which terminates in another horizontally scored line at 24. Along the line 24 the cardboard 14 is folded completely upon itself and continues downward with the portion 26 to the horizontally scored line 28. The adjoining portion 30 continues to another scored line at 32 and then with another panel 34 which is adhesively secured in any suitable way to the portion 18 adjacent the joint 16. At 36 is another horizontal scored line and the cardboard 14 can be further traced by the portion 38, the scored line 40, the portion 42, the scored line 44, the portion 46 and the scored line 48. From the line 48 the cardboard extends upwardly in the form of a panel 50, the upper edge of which is adhesively secured to the panel portion 34 adjacent the joint 16.

Figure 8:
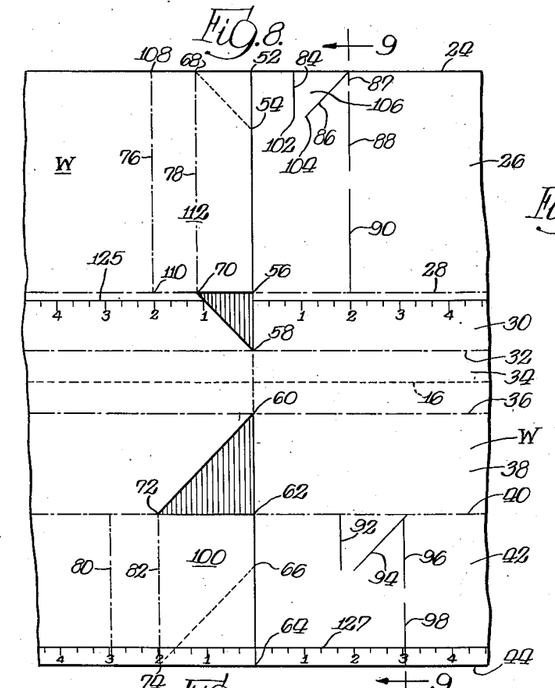
Figure 8 is an elevational view of the central portion of an expandable wall section which constitutes one of the parts of our demonstration set. The view represents the wall section in its flattened form.

In elevation, the central portion of the expandable wall section W, in its unexpanded form, appears as in Figure 8. The horizontal extent of the section may be as great as desired, and is limited only by the conventional commercial sizes of cardboard and by convenience in handling, shipping, etc.

Figure 9:
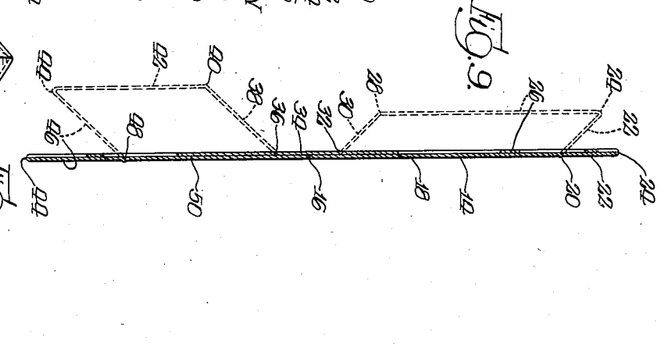
Figure 9 is a vertical cross-sectional view taken on the line 9—9 of Figure 8. In dotted lines it shows how portions of the expandable wall section are opened into shape for representing desired portions of a kitchen cabinet installation.

As can be seen by the dotted portions of Figure 9, the cardboard can be bent along the scored lines, such as 20, 24, 28 and 32, and the bending can be carried to the point at which the panel portions 18, 22, 26 and 30 form a rectangular parallelepiped with open ends. The portions 22 and 30 are formed of such dimensions as to represent the depth of a kitchen wall cabinet to the selected scale, which will be the same scale selected for the spacing of the floor lines 12 in Figure 1. The portions 18 and 26 will be formed of proper dimensions to represent the height of kitchen wall cabinets to the selected scale. The portions 50, 38, 42 and 46 are also capable of being bent into the form of a rectangular parallelepiped and will be formed to the same scale.

For convenient assembly of a miniature representation of the corner of a kitchen or other room, we form the expandable wall section W in a manner which we have found extremely useful and most adaptable for the purpose. As indicated by the reference numerals in Figure 8, we cut the cardboard 14 along the line connecting the points 52, 56, of the portion 26, and along the line connecting the points 62, 64 of the portion 42.

Furthermore, we completely cut out the areas bounded by the points 52, 54 and 68 in portion 22, by the points 56, 58 and 70 in the portion 30, by the points 60, 62 and 72 in the portion 38 and by the points 66, 64 and 74 in the portion 46. We also score the portion 26 with vertical lines at 76 and 78, and similarly score the portion 42 with vertical lines at 80 and 82. The back of the expandable wall section, comprising the portions 18 and 50, is vertically scored along the line joining the points 54 and 66, and in front, the panel 34 is scored between the points 58 and 60. We cut through the panel 26 on the lines designated as 84, 86, 87, 88 and 90, and through the panel 42 on the lines 92, 94, 96 and 88.

Figure 12:
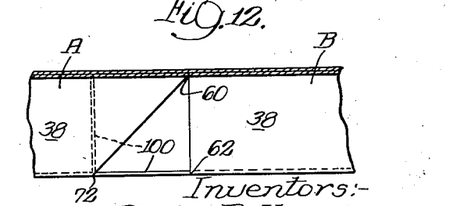
Figure 12 is a view similar to Figure 10, but taken as on the line 4—4 of Figure 1, showing the counter top or work table portion before the wall section is folded to form a wall corner.

Figure 12 represents a view looking down on the base section represented by the portion 38 when it has been folded into rectangular or fully expanded position.

Figure 13:
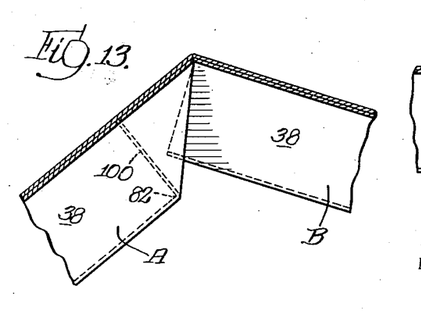
Figure 13 is similar to Figure 12, but shows the wall section in the process of being bent to form a wall corner.

In Figure 13 we have shown that the flap 100, which is represented in Figure 8 by the portion of the panel 42 bounded by the points 62, 64, 74 and 72 may be bent inwardly. This tends to keep the panels 38, 42 and 46 expanded in rectangular position and also gets the flap out of the way of further operations. The rectangular tube formed by expanding the portions 38, 42 and 46 to the left of the center line in Figure 8, is indicated generally as A in Figure 13. A similar rectangular tube is formed by expanding the corresponding members to the left of the center line in Figure 8, (line 52—64) and such rectangular tube is designated by B in Figure 13. It is found very easy to bend the entire wall section along the line joining the points 54—66, and at the same time to insert the end of rectangular tube B into the end of rectangular tube A.

Figures 2, 3, 4, 5, 6, 7:
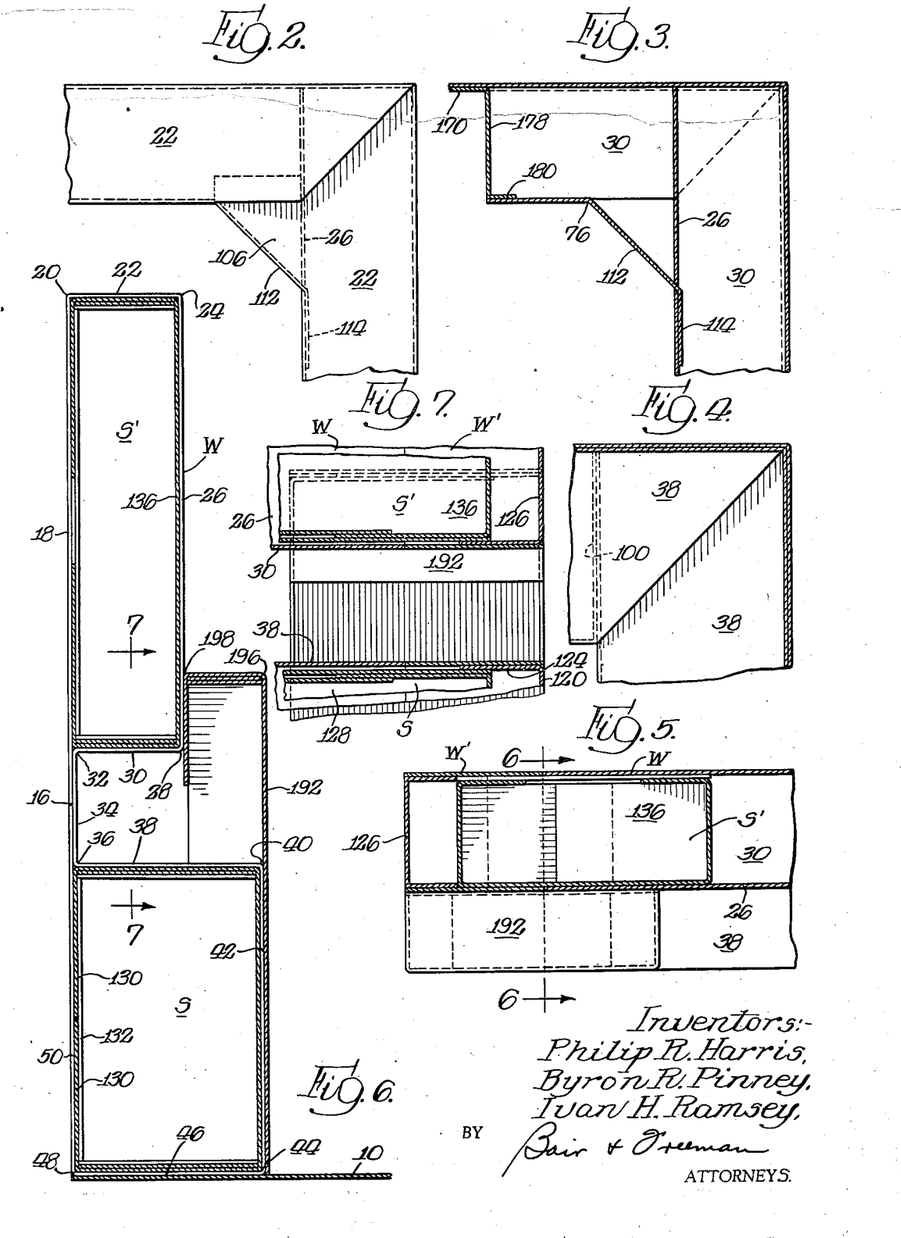
Figure 2 is an enlarged top plan view taken on the line 2—2 in Figure 1.
Figure 3 is an enlarged cross-sectional view taken on the line 3—3 of Figure 1.
Figure 4 is an enlarged view taken on line 4—4 of Figure 1, being a top plan view of the counter portion and a horizontal cross-sectional view of the wall portion thereof.
Figure 5 is an enlarged horizontal cross-sectional view taken on the line 5—5 of Figure 1.
Figure 6 is an enlarged vertical cross-sectional view taken on the line 6—6 of Figure 1. The line on which this section is taken is also similarly indicated in Figure 5.
Figure 7 is a vertical cross-sectional view taken on the line 7—7 of Figure 6.

Figure 4 shows the result in completed form of the operation represented in Figure 13.

At the same time, the rectangular tube C (Figure 11) should be held in opened position, to permit the end of the adjacent rectangular tube D being folded into it.

In Figure 1 it will be seen that the lower or base portion is formed in a square inside corner, whereas the wall cabinets above include a so-called corner cabinet, the door of which makes an angle of 45° with the front faces of the cabinets on either adjoining wall. This form of cabinet gives somewhat greater space for storage inside.

Figure 10:
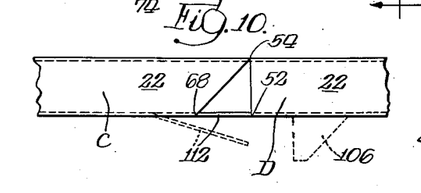
Figure 10 is a top plan view looking downwardly upon the subject matter of Figure 9 and shows the wall section as it appears when the parallelepiped sections are expanded into full rectangular form, but before the wall section is bent as on line 54—56 Figure 8 to form a wall corner.
Figure 11:
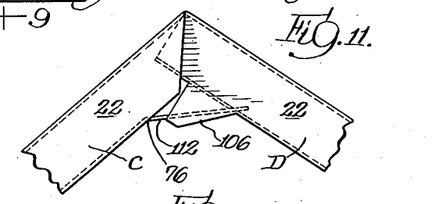
Figure 11 is a view similar to Figure 10, but shows the wall section being bent into the form of an inside wall corner, with a representation of a triangular or 45° wall corner unit.

The expandable wall section shown in Figures 8-13 incorporates an arrangement whereby either the wall cupboard section or the base cabinet section can be made with a 45° corner cabinet if desired. In Figure 1 as above mentioned, we have shown the wall cupboard with the corner cabinet form, and Figures 10 and 11 show this form in process of assembly.

It will be noted that the slits 84 and 86 in the portion 26 of the cardboard 14 approach each other at their lower ends 102 and 104.

When it is desired to form a 45° corner cabinet, a horizontal cut is made through the portion 26, joining the ends 102 and 104 of the slits 84 and 86. This leaves a flap 106 which can be bent about the scored line 24. When forming a corner cabinet we also make short vertical cuts connecting the slits 87, 88 and 90 and horizontal cuts connecting the points 68—108 and 70—110. The latter cuts leave a flap 112 bounded by the points 52, 56, 110 and 108, which may be bent about the scored line 76. When the expandable wall assembly is folded along the line 54—66, the flap 108 must be held in horizontal position (shown dotted in Figure 10), and the flap 112 is inserted in the slit which forms a continuation of 87, 88 and 90. The representation of a 45° corner cupboard is thus obtained, as at 142 in Figure 1.

Figures 2 and 3 also show the result in completed form of the operation represented in Figure 11. In Figure 3, a portion 14 of the flap 112 is shown as lying flat along the inside surface of the panel portion 26. It can be maintained in this position by any suitable adhesive means, and we have found in the assembly of many demonstration sets of this kind that a transparent mending tape, such as the so-called Scotch cellulose tape, is excellent for the purpose. In some cases, ordinary rubber cement or other adhesive can be used to good advantage.

It should be noted that the panels forming the base portion are provided with similar slits, i. e., 92, 94, 96, 98 and the scored line 80, whereby a 45° corner in the base portion may be obtained, if desired, in a manner corresponding to that employed in the wall cupboard portion.

Figures 14, 15, 16, 17, 18, 19:
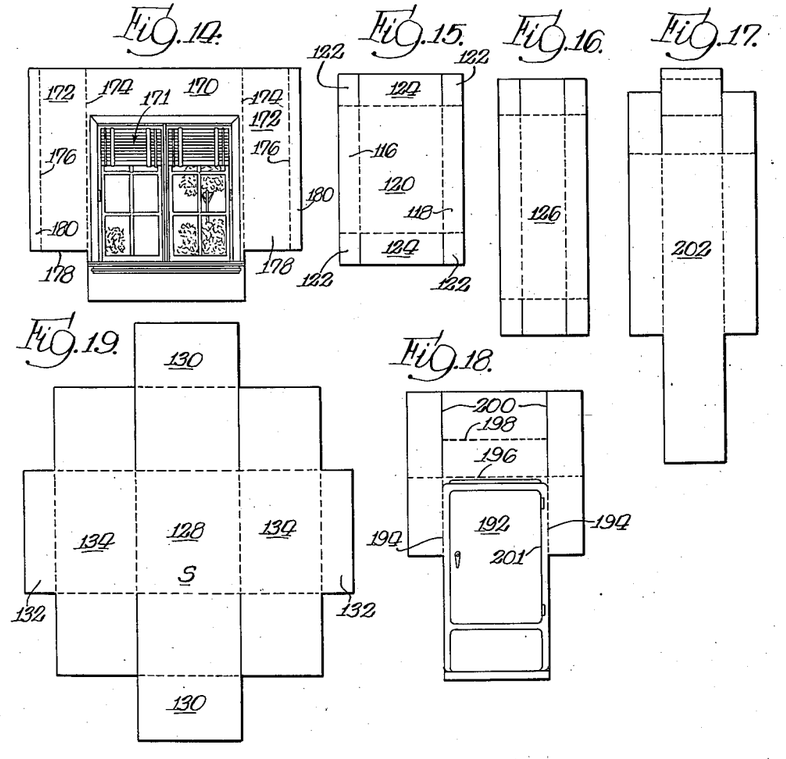
Figure 14 is a layout view showing what we call a window insert.
Figure 15 is a layout view of the element used to form what we have called an end plug for the base cabinet section.
Figure 16 is a similar view of the element used to form an end plug for the wall section.
Figure 17 is a layout view of an element used to form a representation of a broom closet.
Figure 18 is a layout view of an element used to form a representation of a refrigerator.
Figure 19 is a layout view of an element used to form what we have called a splicing plug for the base section.

It will be understood by anyone who has had experience with cardboard display materials that the rectangular tubes A, B, C and D will have a tendency to collapse. Some means must be provided to maintain them in the desired rectangular form. For this purpose we supply the cardboard parts shown in Figures 15 and 16. Dash lines on the drawing represent scoring to facilitate folding. In Figure 15, for example, the sides 116 and 118 can be bent up at right angles to the central portion 120. The end flaps 122 are then bent inwardly at right angles and the ends 124 are bent up perpendicular to the portion 120. A shallow box-like member P is thus formed, which can be inserted into the end of the rectangular tube B, constituting a closure therefor, as may be seen in Figure 1 at the right-hand side of the figure. We call the member P so used, an end plug. An identical end plug P is seen at the left-hand side of Figure 1, and in section in Figure 7.

The member indicated generally at 126 in Figure 16 can be folded in the same way to form an end plug P' for the wall cabinet sections.

The end plugs P and P' serve to keep the rectangular tubes A, B, C and D in shape. In addition, they comprise a closure for the ends of the tubes, whereby they contribute to the realism and attractive appearance of the model.

It is sometimes desirable to represent a room in which one or both walls are greater in horizontal extent than can be represented by the wall section W alone. For such a case, we provide additional wall sections W', being substantially the same in cross section as W (Figure 9), but without any of the slits (such as 84, 86, 88, 94, 98) or vertical scoring (such as 76, 78, 80, 82), and of any desired length. A section W' can be added, as will be seen at the left side of Figure 1, to extend the section W to the desired distance.

On the wall sections W and W' we have found it a convenience to have scales such as 125 and 127 in Figure 8, indicating lengths along the wall in the scale to which the model is designed. This is an aid in locating the spaces to be occupied by doors and windows, either in assembling the model for a new house, or in adapting a cabinet installation to the space available in a kitchen already built. It shows quickly the overall space which will be occupied by any particular combination of cabinets, when the stickers representing that combination are laid out side by side on the panels 26 and 42. The presence of the scales 125 and 127 means that no calculations or additional measuring devices are necessary in cutting the wall section W to proper length, or in adding a section W' of desired length.

In order to get a smooth and inconspicuous joint where such an extension is made, and in order to further maintain the desired rectangular shape of the tubes, we make a splicing means which meets the requirements admirably.

Figure 20:
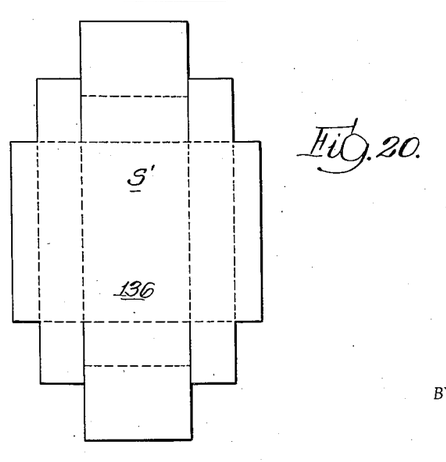
Figure 20 is a similar layout view of an element used to form a splicing plug for the wall sections.

The means referred to is exemplified in Figures 19 and 20. The cardboard sheet indicated generally by 128 in Figure 19 can be folded into the form of a box, somewhat like the sheet of Figure 15, but with the addition of flaps 130 and 132. The flaps 134 have approximately the same dimensions as the inside of the rectangular tube A or B, and when the sheet 128 is folded up to form a splicing plug S, it can be inserted into the tube. The plug S is pushed about half its length into the tube, and constitutes, in effect, a cardboard dowel. The added section W' is fitted over the portion of S which projects from the section W. It will be noted that Figure 6 is taken in the plane of the joint between W and W'.

The sheet 136 of Figure 20 can be folded up in a similar way and used as a splicing plug S' for the wall cabinet section. The location of this plug in the assembled model is perhaps best shown in Figure 5, where it appears in section. The plugs S and S' are shown also in Figures 6 and 7.

To form a second corner of the room, another section W may be added, using splicing plugs S and S' in the manner just described. By carrying out the same procedure, all four sides of the room can be shown if desired.

To indicate the details of the kitchen cabinet installation, we provide gummed sheets or stickers, which bear printed representations of the various units. The stickers can be affixed to the surfaces of the rectangular tubes A, B, C or D in any desired arrangement. Various types of cabinets are represented, as shown in Figure 1, at 138, 140, 142, 144 and 146. Typical base cabinets are shown at 148 and 150 and drawer units at 152 and 154. These stickers are furnished in many styles, and in a range of sizes representing accurately to scale the various standard sizes of cabinets which may be employed in furnishing the kitchen.

By laying out the stickers on a sheet of cardboard, the prospective builder can arrange and rearrange the cabinet layout until a satisfactory one is obtained. A model may then be made up as in Figure 1, using the parts of our demonstration set, and the completed model gives a striking three dimensional display of the installation as planned.

To make the picture complete, we also furnish stickers showing stove top (156), stove front (158), sink (160), sink back (162), shelves (164, 166), clock (168), etc. For simplicity in the drawings, the extra thickness of paper represented by the stickers has not been shown.

As is well known, the preferred location for the sink is under a window, and we provide members in our set for convenient representation of the window opening. These members comprise cardboard sheets such as 170 in Figure 14 with a window design 171 printed thereon. Our set includes several such members in various widths, and showing various standard types of windows. The sheet 170 has flaps 172, marked off by scored lines 174 and 176 into portions 178 and 180. The portions 178 and 180 are folded into the shape indicated in section at the left side of Figure 3. The member thus formed we call a window insert.

The space intended for the window is cut out of the rectangular tube C by cuts along the lines joining the points 182, 184, 186, 188, 190, etc. In Figure 1. The window insert 170 is then slipped into place in the space thus cleared. The portions 178 of the flaps 172 close the open ends of the tube C and the portions 180 can be secured with tape or adhesive cement to the back side of the front panel 26 of the tube, to maintain the flaps 172 in position and the insert 170 in place.

It need hardly be said that in addition to the window openings there are other portions of the wall space not occupied by cabinets. Such spaces are provided for simply by cutting away parts of the rectangular tubes, as in the case of the window. For a door, of course, both upper and lower tubes would be cut away, and the ends thus exposed would be closed by plugs P and P'. Instead of cutting away parts of the tubes, it may be preferable in some cases simply to cut off the entire wall member W or W', and to add to it a piece of plain cardboard to which a sticker with the representation of a door, for example, is attached.

A stove entirely away from the cabinets would be represented by a portion of the lower tube, the adjacent parts of the tube being cut away, and the ends of the portion mentioned being closed by plugs P and P'. Stickers like 156 and 158 would be applied to complete the representation.

It will be apparent to one skilled in the art that the procedure thus illustrated by examples can be carried out to produce a great variety of designs, comprising various arrangements of the kitchen paraphernalia in a given space.

The form and use of the apparatus which we have developed for the purpose derives from the fact that in a modern kitchen plan a very considerable portion of the wall space is occupied by sink, stove, storage cabinets, work tables, etc., and from the further fact that in the construction of a model of such a kitchen, it is much easier to start with a folded blank such as we have devised, and cut away what is not wanted, than it is to build up each unit individually, to scale, and to assemble the completed units in model form, for what is wanted.

A typical kitchen contains elements which do not correspond very closely, either in height or depth, to the wall and base cabinets principally indicated by our wall members W or W'. The refrigerator and broom closet are examples. In an actual installation, they are higher than the base cabinet section, and reach up into the space occupied by the wall cupboards. In depth, they actually occupy approximately the distance between the front face of the base cabinets and the wall.

The refrigerator and broom closet could be represented in our set by regular box-shaped members, proportioned to be full depth, to scale. However, making room for them against the "wall" by cutting away both upper and lower rectangular tubes would unnecessarily complicate the job of preparing one of our scale models, and would destroy the rigidity of the assembly. We have found that construction of the model can be greatly simplified without any important sacrifice in the realism, by the use of what we call overlay sections.

A section of this kind is shown in Figure 18, and comprises a cardboard sheet 192, the top part of which can be folded by reason of the scored lines 194, 196 and 198, and the cuts 200, to form a partial box. The parts can be taped or secured with adhesive cement to retain the box form. In this case, the sheet 192 has a refrigerator outline 201 printed on its face and the completed overlay section is cemented in place on the model at the location designated by the builder for the refrigerator, as at the left in Figure 1. It will be seen that no cutting is required. The horizontal depth of the made-up overlay section is just sufficient to fill the horizontal distance between the face 42 of the base portion, and the face 26 of the wall portion.

A similar overlay section is shown flat and indicated as 202 in Figure 17. In folded form, as a broom closet, it appears at the right of Figure 1. In this case the cardboard is shown blank in Figure 17, the door design 204 shown in Figure 1 being applied by affixing a suitable sticker. The same method may be used with the refrigerator overlay section 192 if desired.

It will be noted that the overlay method leaves an opening between the wall cupboard section and the base cabinet section, as for example behind the refrigerator 192 in Figure 1. We find this is not particularly objectionable, but the opening may be covered by means of added cardboard if greater realism is desired.

In view of the foregoing description, the remarkable adaptability of the elements of our demonstration set for the representation in miniature of household layouts throughout a wide range of possible arrangements, will be apparent. The component parts are light, flat, easy to store and to carry. The features detailed above make assembly of a typical layout a quick and simple task.

The apparatus represents a salesman's tool of great effectiveness in the merchandising of unit built sectional cabinets. Its flexibility facilitates the construction of a particular layout best fitted to the available space and to the user's needs. The finished model, showing the proposed installation to scale in length, height and depth, is a powerful aid in visualizing the plan, and, obviously, in selling the merchandise.

Some changes may be made in the construction and arrangement of the parts of our device without departing from the real spirit and purpose of our invention, and it is our intention to cover by our claims, any modified forms of structure or use of mechanical equivalents, which may be reasonably included within their scope.

We claim as our invention:

1. In a demonstration set of the character described, a device representing a portion of a room in miniature comprising a pair of wall members at right angles to each other, a floor member spanning the distance between the bottom edges of said wall members, portions of said wall members comprising panels connected at their edges to form parallelograms in cross section, and being extensible outwardly to represent wall cabinets, representations of cabinet fronts adapted to be adhesively secured to said panels, an opening in said wall cabinet representation formed by cutting away portions of said panels, a card representing a window or the like, placed in said opening and retained against transverse movement by abutment with the edges thereof and flaps on said card forming closures for the ends of said cabinet representations exposed by said opening formed therein.

2. A demonstration set constituting a device representing a portion of a room and comprising a wall member, a floor member extending forwardly from the bottom edge thereof, portions of said wall member comprising three panels arranged edge to edge with the terminal edges connected to said wall member and cooperating therewith to form a parallelogram in cross section, said three panels being extensible outwardly from said wall member to represent wall cabinets, an additional wall member in adjacent relation forming a continuation of said first mentioned wall member, three panels on said additional wall member, connected in parallelogram form as on said first mentioned wall member, and a cardboard dowel piece extending partially into the parallelogram formed by said panels of said first mentioned wall member and partially into the parallelogram formed by said panels on said additional wall member, said dowel piece having portions parallel and adjacent to each of said panels, said portions being substantially equal in width to the adjacent panels, making a smooth joint between said wall members, and a rectangular flap at each end of said dowel, extending in parallel planes perpendicular to said panels to retain said panels extended in rectangular parallelogram cross section.

3. A demonstration set constituting a device representing a portion of a room and comprising a wall member, a floor member extending forwardly from the bottom edge thereof, two sets of hingedly connected panels, each set comprising three panels arranged edge to edge with the terminal edges connected to said wall member and cooperating therewith to form a parallelogram in cross section, said sets being extensible outwardly from said wall member to represent upper and lower wall cabinets, the central panel of the set representing upper cabinets lying in a plane parallel to said wall member, and the central panel of the set representing lower cabinets lying in a second plane parallel to the first and at a substantially greater distance from said wall member.

4. In a demonstration device for representing the interior of a room in miniature, a sheet of foldable material adapted to be bent along a line transversely of said sheet to form two walls, connected panels of flat material on said sheet, said panels being connected to open into rectangular tubular extensions from said walls, and cut-away portions formed in said panels adjacent said line to permit folding of said sheet along said line and to permit the junction of said rectangular tubular extensions in the angle so formed.

5. In a demonstration device for representing the interior of a room in miniature, a sheet of foldable material adapted to be bent along a line transversely of said sheet to form two walls, and connected panels of flat material flexibly attached to said sheet, said panels being connected to form parallelepipedons extensible to rectangular form at the top and at the bottom of said sheet, the pair of parallelepipedons on one side of the above mentioned transverse line being truncated adjacent said line at an angle of approximately 45°.

6. In a demonstration device for representing the interior of a room in miniature, a sheet of foldable material adapted to be bent along a line transversely of said sheet to form two walls, panels of flat material flexibly attached to said sheet, said panels being connected to form parallelepipeds extensible to rectangular form at the top and at the bottom of said sheet with a space between them, the pair of parallelepipeds on one side of said transverse line having flaps adapted to extend at an angle of approximately 45° between points on the faces of said parallelepipeds spaced from the intersections of said faces.

7. In a demonstration device for representing the interior of a room in miniature, a sheet of foldable material adapted to be bent along a line transversely of said sheet to form two walls, connected panels of flat material foldably attached to said sheet, said panels being connected to form parallelepipedons, extensible to rectangular form, the top and bottom panels of the parallelepipedon on one side of the above mentioned transverse line being truncated adjacent said line at an angle of approximately 45° and adapted to receive the adjacent end of the other parallelepipedon, a flap extending from the front panel of said truncated parallelepipedon, between said top and bottom panels thereof to maintain said parallelepipedon in rectangular form at that point and end plugs insertible in the outer ends of said parallelepipedons to retain said parallelepipedons in rectangular form at said ends.

8. In a demonstration device for representing a room in miniature, a sheet of material adapted to be bent along a line transversely of said sheet to form a left portion and a right portion, foldably hinged connected panels of flat material attached to said sheet, said panels being openable for forming with said sheet parallelepipedons, one on said left portion and one on said right portion, said parallelepipedons being extensible to rectangular form, the top and bottom panels of the parallelepipedon on one side of said transverse line being truncated adjacent said line at an angle of approximately 45°, a flap extending from the front panel of said last mentioned parallelepipedon, a slit in the front panel of the parallelepipedon on the other side of said transverse line, said flap being inserted into said slit when said sheet is bent at right angles along said transverse line, said flap forming thereby a representation of a diagonal corner cabinet.

9. In a demonstration device, a sheet of material adapted to be bent along a line transversely of said sheet to form a left portion and a right portion, horizontally extending flexibly connected panels attached to said sheet, said panels forming with said sheet parallelepipedons, one on said left portion and one on said right portion, said parallelepipedons being extensible to rectangular form, the top and bottom panels of the parallelepipedon on one side of said transverse line being truncated adjacent said line at an angle of approximately 45°, a flap extending from the front panel of said last mentioned parallelepipedon, a slit in the front panel of the parallelepipedon on the other side of said transverse line and spaced from the intersection of the faces of said parallelepipedons, said flap being inserted into said slit when said sheet is bent at right angles along said transverse line, said flap then extending at an angle of approximately 45° between points on the faces of said parallelepipedons spaced from the intersections of said faces.

10. In a device for representing a room in miniature, a vertical panel representing a wall of the room, a member forming a parallelepipedon extending horizontally adjacent the lower edge of said panel, and an element having an upper box-like portion and a lower portion consisting of an extension of the front of said box-like portion, said lower portion being applied to the front vertical face of said parallelepipedon, said upper box-like portion being supported above said parallelepipedon thereby.

11. In a demonstration device, a vertical panel representing a wall of a room, a horizontally extending rectangular tube adjacent the lower edge of said panel, a second horizontal extending rectangular tube adjacent the upper edge of said panel and an element having an upper box-like portion and a lower portion consisting of an extension of the front of said box-like portion, said lower portion being applied to the front vertical face of said first rectangular tube, and said box-like portion being adjacent said second rectangular tube.

12. In a demonstration device, a vertical panel representing a wall of a room, a member extending outwardly from said panel adjacent the lower edge thereof to represent a base cabinet, a second member extending outwardly from said panel and vertically spaced above said first member to represent a wall cabinet, said first member extending further outwardly from said panel than said second member, and an element having an upper box-like portion and a lower portion consisting of an extension of the front of said box-like portion, said lower portion being applied to the vertical front face of said first member, the depth of said box-like portion being approximately the same as the amount by which the first member extends outwardly beyond the second member.

13. In a device for representing a room in miniature, a vertical panel representing a wall of a room, a member forming a lower parallelepipedon extending horizontally adjacent the lower edge of said panel, means applied to the faces of said lower parallelepipedon representing a sink, a second member forming an upper parallelepipedon extending horizontally adjacent the upper edge of said panel, and means for representing a window in the wall of the room comprising an opening formed in said upper parallelepipedon, and a window insert located therein, a central portion of said window insert bearing a representation of a window, and being located adjacent said vertical panel and parallel thereto within said opening formed in said upper parallelepipedon, wing portions of said window insert extending from said central portion at right angles thereto, and forming closures for the ends of said upper parallelepipedon exposed by the opening formed therein, and flaps attached to said wing portions and extending longitudinally along the inner surface of the front face of said upper parallelepipedon.

14. In a device for representing a room in miniature, a vertical panel representing a wall of a room, a member forming a parallelepipedon extending horizontally on said panel, and means for representing a window in the wall of the room comprising an opening formed in said parallelepipedon, and a window insert located therein, a central portion of said window insert bearing a representation of a window, wing portions of said window insert extending from said central portion at right angles thereto, and forming closures for the ends of said parallelepipedon exposed by the opening formed therein, and flaps attached to said wing portions and extending longitudinally along the inner surface of the front face of said upper parallelepipedon.

15. In a device for representing a room in miniature, a vertical panel representing a wall of a room, a member forming a parallelepiped extending horizontally adjacent the upper edge of said panel, and means for representing a window in the wall of the room comprising an opening formed in said parallelepiped, and a window insert located therein, a central portion of said window insert being located adjacent said vertical panel and parallel thereto and wing portions of said window insert extending from said central portion and forming closures for the ends of said parallelepiped exposed by the opening formed therein.

16. In a demonstration device, a vertical panel representing a wall of a room, a member forming a tube extending along said panel, and means for representing a window in the wall of the room comprising an opening formed in said tube and a window insert located therein, said insert being formed with a central portion, and wing portions extending from said central portion and forming closures for the portions of said tube exposed by the opening formed therein.

17. In a demonstration device for representing a room and wall cases in miniature, a foldable sheet for representing a wall, said wall sheet being adaptable for folding at right angles on a vertical line, panels hingedly attached to said sheet and adapted to be forwardly extended to form horizontally disposed rectangular tubes, and cut-away portions and flaps formed adjacent said line on the extended tube portions to permit said folding of said wall sheet and to provide continuous box-like extensions around a corner so formed.

18. In a demonstration set, a pair of wall members intersecting at an angle, a floor member spanning the distance between the bottom edges of said wall members, and panels flexibly connected at their edges to form two collapsible tubes of parallelogram cross-section extending horizontally along each of said wall members, said tubes being spaced from each other, one being adjacent the upper margin of the wall member and the other being adjacent the lower margin thereof, said latter tube, when opened to rectangular form, extending a greater distance from its associated wall member than does the former tube when opened to rectangular form.

19. In means for representing a portion of a room to a selected scale, a wall member, a floor member, lined squares on the floor member indicating units of the selected scale, panels flexibly connected at their edges to form two collapsible tubes of parallelogram cross section extending horizontally along said wall member, one being adjacent the upper margin of said wall member and the other being adjacent the lower margin thereof, and markings extending horizontally on each of said tubes, denoting the selected scale.

20. In a demonstration set, a wall member, panels flexibly connected to said wall member to form a collapsible member of parallelogram cross section, a second wall member having a similar collapsible member thereon, and means for joining said wall members comprising a cardboard dowel piece having a portion extending into said first collapsible member and a portion extending into said second collapsible member, each of said portions having a flap extending transversely to the associated collapsible member to retain said member in extended position.

21. In a demonstration device for representing the interior of a room in miniature, a sheet of foldable material adapted to be bent along a line transversely of said sheet to form two walls, panels connected to said sheet and adapted to open therefrom and form a rectangular tube lying against said sheet, on each wall, a flap portion of the front panel of one of said tubes foldable outwardly along a vertical line and extensible toward the front panel of the other of said tubes, and flap portions of the front panel of said other of said tubes foldable outwardly along horizontal lines and engaging the top and bottom edges of said first mentioned flap portion.

22. In a demonstration device of the kind disclosed, a sheet of foldable material to form a wall, panels of flat material foldably attached to said sheet, said panels being connected to form a parallelepiped when unfolded, a second sheet, panels thereon similarly formed, a cardboard dowel piece adapted to provide a smooth joint between the parallelepipeds on said two sheets, said dowel piece extending partially into each of said parallelepipeds, and a rectangular flap at each end of said dowel, extending in a plane substantially perpendicular to said panels, to retain them extended in rectangular parallelepiped form.

PHILIP R. HARRIS.
BYRON R. PINNEY.
IVAN H. RAMSEY.